United States Patent

Springs

[15] 3,679,340
[45] July 25, 1972

[54] APPARATUS FOR FORMING BUILDING BLOCKS

[72] Inventor: Thomas W. Springs, Alpena, Mich.

[73] Assignee: Besser Company, Alpena, Mich.

[22] Filed: Sept. 15, 1969

[21] Appl. No.: 858,032

[52] U.S. Cl. ............................. 425/163, 264/71, 264/333, 425/424, 425/432, 425/444, 425/452, 425/457, 425/186
[51] Int. Cl. ........................................ B28b 1/08, B28b 7/18
[58] Field of Search ................. 264/69, 71, 72, 333; 25/41 E, 25/41 J, 41 G, 128 R, 128 K

[56] References Cited

UNITED STATES PATENTS

| | | | |
|---|---|---|---|
| 2,583,597 | 1/1952 | Ryner | 25/41 J |
| 3,050,808 | 8/1962 | Clanton et al. | 25/41 E |
| 3,504,408 | 4/1970 | Jones | 25/41 G |

Primary Examiner—Robert F. White
Assistant Examiner—J. H. Silbaugh
Attorney—Learman, Learman & McCulloch

[57] ABSTRACT

An apparatus for forming a building block, having conventional vertically extending, upwardly opening block cavities with a longitudinally extending channel in its lower surface. The block is made in a vibrated mold box assembly open at its upper and lower ends and a pallet is movable into position to form a removable mold cavity closing bottom wall for the assembly. A longitudinally removable core, which is resiliently mounted on a core adapter so that it can vibrate with the mold box assembly, is moved from a removed position to a position beneath the mold cavity and the pallet is then moved vertically to sandwich the core between the mold and pallet. After cementitious material is introduced into the mold cavity to form the block and the assembly is vibrated, the core is removed, and the block and pallet are then vertically stripped from the mold assembly and moved away for further processing.

17 Claims, 6 Drawing Figures

INVENTOR
THOMAS W. SPRINGS

PATENTED JUL 25 1972    BEST AVAILABLE COPY    3,679,340

INVENTOR
THOMAS W. SPRINGS

BY

Learman, Learman & [illegible]

APPARATUS FOR FORMING BUILDING BLOCKS

This invention relates to an apparatus for forming a building block of unique design, and more particularly to a method and apparatus for forming a channel in the exposed surface of one wall of such a block.

In the past, building blocks have been conventionally formed with generally flat wall surfaces and a plurality of enlarged bores therethrough extending generally in one direction. Such blocks are generally utilized in a wall construction by placing one on top of another and securing them together by means of a hardened cementitious material, such as mortar. In areas of the world where buildings are subjected to large vibratory forces, such as those resulting from earthquakes, walls formed from conventional building blocks are only marginally satisfactory. Contributing to the poor results of conventional wall structure is the fact that, although each block is rigidly bonded to the blocks immediately adjacent thereto, there are no reinforcing members unifying the entire wall structure. Such unifying wall structure could comprise a plurality of reinforcing rods which are placed in the interior of the wall and extend horizontally about the perimeter of the building as well as vertically.

Accordingly, it is an object of the present invention to provide apparatus for forming a building block which has both a longitudinally extending through channel and vertical cavities therein.

Another object of the present invention is to provide apparatus for forming a building block which will have a channel extending in one exposed wall surface thereof.

Still another object of the present invention is to provide apparatus for forming a building block which can be utilized to form various sizes and shapes of channels in the building block without modifying the pallet members which are utilized to support the block in a block making machine.

Still another object of the present invention is to provide apparatus for forming a building block wherein a removably mounted core is positioned adjacent a block carrying pallet to form a channel in one wall surface of the block.

Briefly, in accordance with the present invention, there is provided apparatus for forming a building block comprising a mold box having a chamber therein which is adapted to receive cementitious material to form a building block, vertically extending removable cores mounted in said chamber for forming vertical cavities in the block, a raisable pallet for forming a removable closure for the chamber and for supporting the formed block, and a longitudinally extending core removably disposed in the mold chamber or cavity for forming a longitudinally extending channel in the material from which the block is formed. The longitudinally extending core is disposed adjacent the raised pallet for forming a channel in one wall surface of the block and is mounted adjacent the mold box on a reciprocably mounted carriage which mounts the longitudinally extending core for longitudinal and vertical movement relative to the mold box.

Other objects and advantages of the present invention will become apparent to those of ordinary skill in the art by the following description when considered in relation to the accompanying drawing in which:

FIG. 3 is a fragmentary sectional view taken along the line 3 — 3 of FIG. 1;

Figure 1:
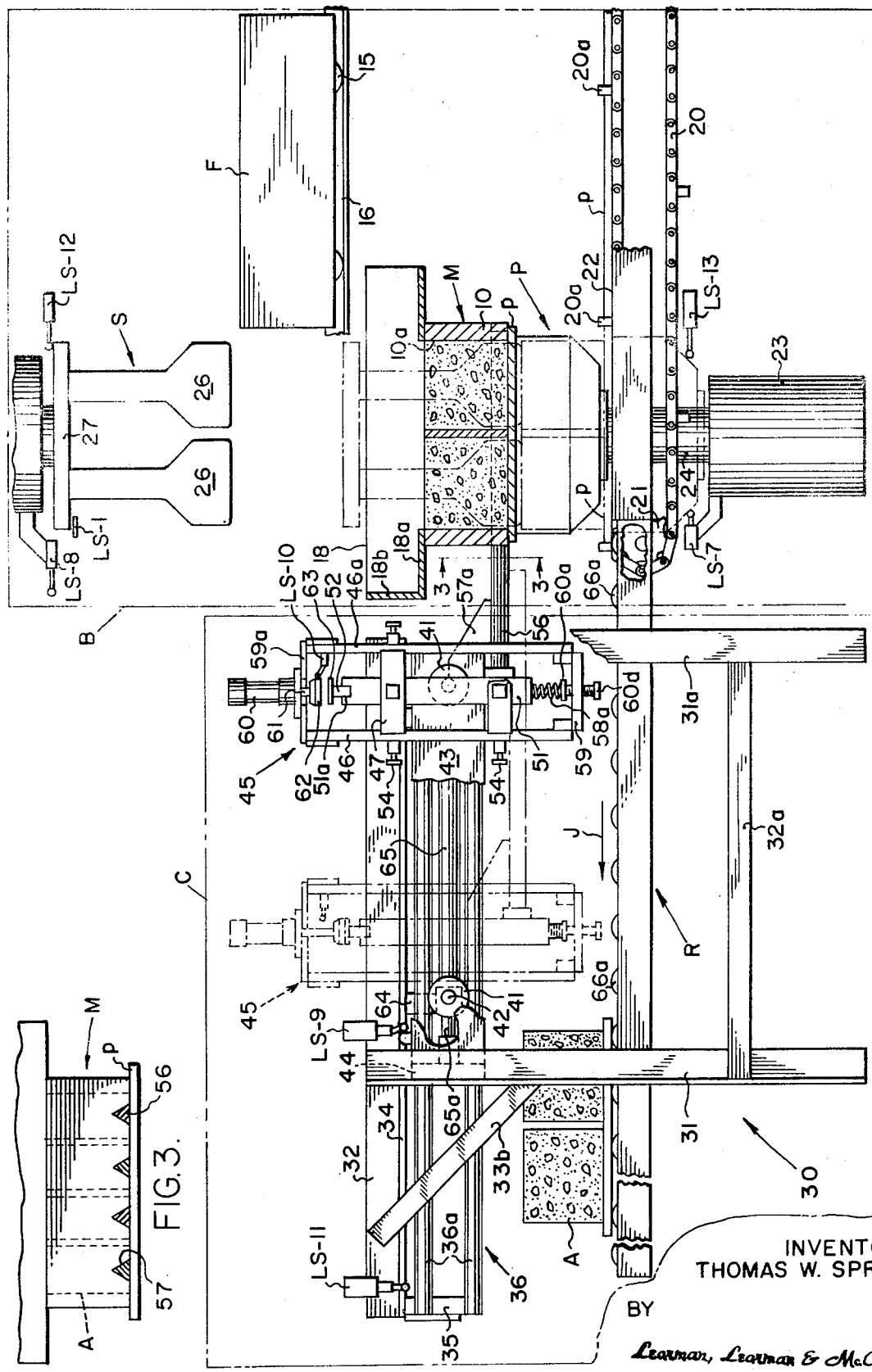
FIG. 1 is a longitudinal side elevational view, partly in section, illustrating the apparatus for forming building blocks according to the invention, the chain lines indicating other positions of some of the parts.
Figure 4:
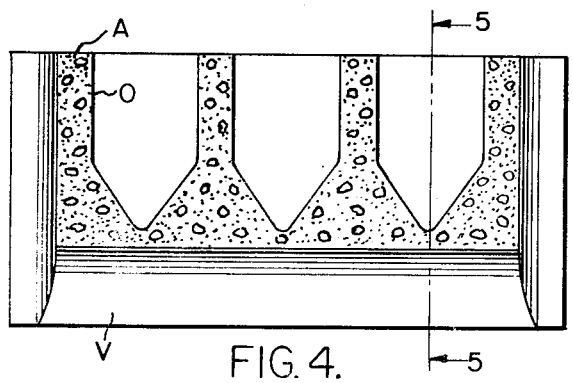
FIG. 4 is a sectional side elevational view of a block formed with apparatus constructed according to the invention.

Referring now to the drawings, a core adapter formed according to the invention is outlined by chain lines in FIG. 1 at C located adjacent a block making machine, outlined by chain lines at B. The block making machine B may suitably comprise a commercially available machine such as that manufactured by Besser Company, Alpena, Michigan under model No. V2H and includes a mold box M having a perimetral wall 10 providing a mold chamber 10a therein in which the four spaced apart compartments 11, 12, 13 and 14 (FIG. 2) are formed by partitions 9. The compartments 11 – 14 are each divided into two block forming chambers 11a, 11b; 12a, 12b; 13a, 13b; and 14a, 14b respectively by a divider such as shown at d. A plurality of cores, one of which is shown at D, are disposed in the compartments 11 – 14 so as to form vertically extending cavities in the moldable material being supplied to the mold box through the open top thereof by a horizontally reciprocal feed box, generally shown at F. These vertically extending cores may be mounted on the mold box in the manner described in U.S. Pat. No. 2,566,787, incorporated herein by reference, and are effective to produce the vertically extending cavities 0 (FIG. 4) in each block A. The feed box F, which is mounted on rollers 15 supported on a pair of laterally spaced apart tracks 16, includes a motor (not shown) for moving it forwardly to a position above the mold box M into position to fill the mold, and then rearwardly to receive the next charge of material from a suitable supply source, not shown. Mounted atop the mold box M is a hopper, generally shown at 18, extending perimetrally about the mold box M and including a horizontally extending shelf portion 18a secured to the upper portion of the wall 10, and vertically extending wall portion 18b which serves to retain the moldable material when the mold box is vibrated during the block forming operation.

A pair of spaced apart endless chains 20 are trained at their forward end around a pair of sprockets 21 for moving individual, imperforate pallets p from a stack (not shown), which is located at the rear of the machine, along a pair of laterally spaced apart supporting tracks 22. A plurality of longitudinally spaced apart flight members 20a span the chains 20, and are adapted to engage the pallets p to sequentially move the pallets p to a position below the mold box M where they can then be elevated into engagement with the bottom of the mold box M by a vertically reciprocable pallet receiving member, generally shown at P, in a manner to be presently described.

The pallet receiver P forms a support for each pallet p and is movable, from the broken line position shown in FIG. 1 to the solid line position shown in FIG. 1, by a piston 24 controlled by a solenoid operated hydraulic cylinder 23. Suitable pallet handling apparatus which may be used is also disclosed in U.S. Pat. No. 2,692,418, which is assigned to the assignee of the present invention, and which is also incorporated herein by reference.

Also included in the block making machine B is a stripper head, generally shown at S, mounted atop the mold box and comprising a plurality of stripper heads 26 depending from a common support 27. The stripper heads 26 are adapted to be reciprocably mounted to move from the full line position shown in FIG. 1 to the broken line position shown in FIG. 1, and may be driven by any suitable drive means such as a solenoid operated air cylinder. The stripper heads 26 are effective to compress the moldable material in the mold box and to subsequently strip the molded blocks therefrom. This stripper mechanism may be constructed in the manner disclosed in the above-identified U.S. Pat. No. 2,566,787, the particular details of same not forming any part of the present invention. The stripper heads 26 are effective to aid in moving the blocks from the mold assembly to a lowered position in which the block supporting pallet p will rest on the tracks 22 as shown in broken lines in FIG. 1 and the pallets p may thereafter be automatically moved along the rollers 66a of the roller assembly R in the direction of the arrow J by a flight member 20a moving another pallet p into position under the mold M.

The core adapter C comprises a frame, generally shown at 30, as including a pair of vertically extending left end support posts 31 and a pair of similar right end support posts 31a. A pair of longitudinally extending lower end connecting members 32a span the support members 31 and 31a. A pair of longitudinally extending upper end connecting angle members 32 are supported between each pair of support members 31 and 31a on the front and rear sides of the frame by a plurality of resilient spacers 33. A pair of resilient spacers 33a also connect the members 32 with support members 33b which are inclined upwardly from the posts 31. A flat, horizontally extending, plate 34 spans the members 32 and a pair of end members, one of which is shown at 35, depend from the plate 34 at opposite ends of the frame 30 to rigidify the structure. Additional end connecting members (not shown) span the posts 30 and 31a to further rigidify the structure.

A pair of tracks 36 are also mounted on the front and rear sides of the frame 30, each of the tracks including a pair of vertically spaced apart rails 36a secured at their opposite ends to the cross-members 35 in any suitable manner, such as by welding. Reciprocably mounted on the tracks 36 is a carriage, generally indicated at 40, including a pair of laterally spaced apart side walls 43, each including longitudinally spaced apart pairs of wheels 41 mounted on a spindle or shaft 42 which is fixed to a side wall 43. The wheels 41 are grooved so as to be received between and ride along the upper and lower rails 36c. Suitable cross-pieces, such as shown at 44, may be provided between the walls 43 to rigidify the carriage 40.

Secured to the right-hand end of the carriage, as viewed in the drawing, is a core support assembly generally designated 45, including a pair of vertically extending spaced apart posts 46 and 46a secured to each of the carriage support plates 43. A pair of vertically spaced apart connecting members 47 span the posts 46 and 46a on each side of the carriage 40 to rigidify the assembly 45. Spanning the posts 46 and 46a on opposite sides of the frame 30, are a pair of connecting members 48.

A vertically movable core support member, generally designated 50, is mounted for vertical reciprocation on the core support assembly 45 and includes a pair of vertically extending posts 51 having bifurcated ends 51a at the upper end thereof adapted to receive a cross-piece 52 which spans the two posts 51. The vertically extending posts 51 are each slidably received in a set of vertically spaced apart guide liners 53 which are adjustably mounted on the connecting members 47 and 48 by any suitable means such as screws 54.

Figure 5:
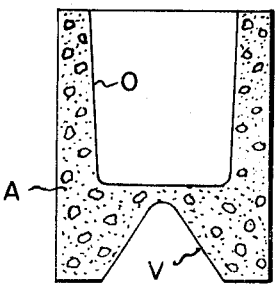
FIG. 5 is a transverse sectional view of the block, taken along the line 5 — 5 of FIG. 4.

Disposed between the lower ends of the vertically extending posts 51 is a mounting plate 55 secured thereto by any suitable means. As will be described more fully hereinafter, a plurality of core members 56 are provided on plate 55 to form a longitudinally extending channel V (FIG. 5) in one wall surface of each of the blocks to be formed. One end of each member 56 is free to be moved under mold box M while the other end is fixed to a gusset 57a by any suitable means such as welding. The gussets 57 are welded or otherwise suitably secured to the mounting plate 55. As shown in FIG. 3, the horizontally extending core members 56 are triangular in cross-section and are adapted to be received in complementally formed triangular cutouts 57 formed in the mold box walls 10 and the partition d in the mold box M.

The core members 56 and support member 50 are resiliently mounted on the core support assembly 45 by a pair of laterally spaced apart vertical springs 58a mounted on threaded members 60d between the lower end of vertically extending posts 51 and cross-members 59 which span the lower sides of the vertically extending posts 46 and 46a. The threaded members 60d which are adjustable relative to plate 59 include spring mounts 60a and may be adjusted vertically to properly set the compression of springs 58a.

Mounted atop the core support assembly 45 is a hydraulic cylinder fixed to the cross member 59a spanning the upper sides of the vertically extending posts 46 and 46a and having a piston 61 depending therefrom for moving a pad 62 into engagement with a pad 63 mounted on the upper portion of the support member 50. By lowering the plate 62 to engage the plate 63, the member 50, with cores 56 mounted thereon, can be moved downwardly from the full line position shown in FIG. 1 against the biasing force of spring members 58a. The core members 56 are then free to be moved longitudinally toward the mold box M until the core members 56 are disposed under the mold box M. After this time, the pad 62 may be raised from the plate 63 by the hydraulic cylinder 60 to the full line position shown in FIG. 1 so that the cores 56 will be moved upwardly by the biasing springs 58a and be received in the cutout portions 57.

Depending from the horizontally extending plate 34 are brackets, one of which is shown at 64, mounting a double acting, solenoid operated air cylinder 65 having a piston 65a secured to the carriage bracket 44. The air cylinder 65 moves the carriage 40 and the core support member 50 between the full line position and the broken line position shown in FIG. 1, in which latter position the core members 56 are longitudinally and vertically removed from the mold box assembly M.

As can be seen in the drawing, the mold box M, the pallet member p placed against the bottom thereof, and the core members 56 extending therebetween jointly form a mold cavity adapted to receive cementitious material from the upper end of the mold assembly M. When the material enters the mold cavity, it will flow over the core members 56 and the pallet member p.

In order to move the core member 56 to the position shown in full lines in FIG. 1, the hydraulic cylinder 60 is energized to lower the member 50 with cores 56 thereon relative to member 45. When the cores 56 are lowered to the broken line position, the air cylinder 65 is operated to move the carriage 40 to the right so that the core members 56 are disposed under the mold assembly M. The hydraulic cylinder piston 61 is then raised to the full line position shown in the drawings and members 56 are raised into the cutout portions 57 of the mold box. As will be explained more fully hereinafter, the core members 56 are subsequently tightly fitted between the pallet member p and the cutouts 57 of walls 10 by thereafter raising the pallet receiver member P upwardly.

The longitudinally extending roller assembly R has a plurality of pallet support wheels 66a mounted on suitable shafts 66 which are secured to the longitudinally extending tracks 22 which extend completely through the machine. Other suitable conveying apparatus which may also be used is shown and described in the above referenced U.S. Pat. No. 2,692,418. The pallet support wheels 66a are freely rotatable and serve to transport the block supporting pallets to subsequent processing stations. Vibrating apparatus for vibrating the mold box M, cores 56, and pallet p as schematically depicted is a motor M' eccentrically connected with the extensions 10' of the mold wall 10 by means of a shaft 71.

Figure 6:
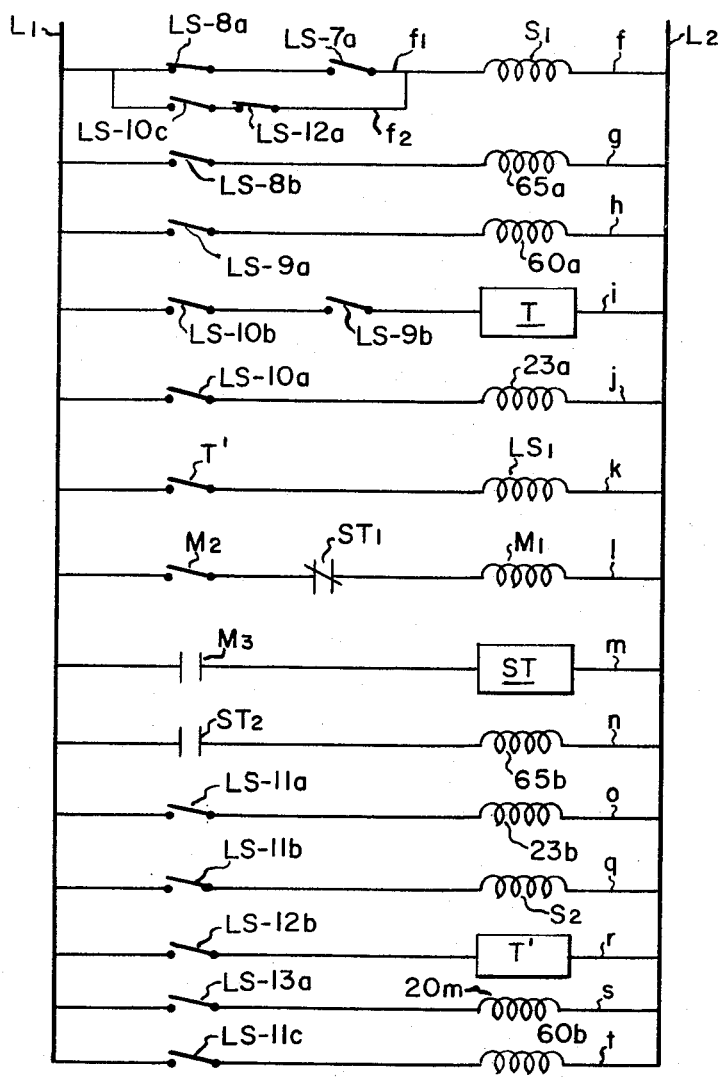
FIG. 6 is a schematic electrical diagram showing a typical control circuit for operating the block forming apparatus.

Referring now to FIG. 6, connected across lines $L_1$ and $L_2$, which are connected with a source of alternating current, are a plurality of lines $f - o$ and $g - t$. Connected in series circuit relation in line $f$ is a solenoid $S_1$ for raising the stripper head S to the full line position shown in FIG. 1 and the parallel circuit comprising lines $f_1$ and $f_2$. Connected in series in line $f_1$ is a set of normally open contacts LS–7a associated with the limit switch LS–7 located adjacent cylinder 23, and the normally closed contacts LS–8a of the limit switch LS–8 mounted on the stripper head S. Connected in series in line $f_2$ are the normally closed contacts LS–12a of the limit switch LS–12 and the normally open contacts LS–10c of the limit switch LS–10. Connected in series circuit relation in line $g$ is the solenoid 65a of cylinder 65 for advancing the carriage to the right as shown in the drawings and the normally open contacts LS–8b which are closed when the relay LS–8 is energized. Connected in series circuit relation in line $h$ is the solenoid 60a which moves the piston rod 61 downwardly and the normally open contacts LS–9a which are closed when the limit switch LS–9 which is mounted on member 32 is actuated. Connected in series circuit relation in line $i$ is a timer T and the normally open contacts LS–9b and LS–10b of limit switches LS–9 and LS–10 respectively. The limit switch LS–10 is mounted on the bracket assembly 45 and is actuated when the plate 62 moves to the full line position shown in FIG. 1. When the timer T times out, it closes a set of contacts $T_1$ connected in series with the coil $LS_1$ in the line $k$. The coil $LS_1$ controls a latching switch LS which latches the stripper head S in the full line position shown in FIG. 1. Connected in series circuit relation in line $j$ is the solenoid 23a for raising the piston 24 and the normally open contacts LS–10a which are closed when the limit switch LS–10 is actuated. Connected in series in line 1 is an armature winding $M_1$ of a motor M' the normally closed contacts $ST_1$ of a timer ST which is connected in circuit in line $m$, and a motor start switch $M_2$ which may be energized when the feed box F moves forwardly over the mold box M. Connected in series circuit relation in line $m$ is the timer ST and the normally open contacts $M_3$ which are closed when the armature winding $M_1$ is energized. Connected in series circuit relation in line $n$ is the solenoid 65b of the cylinder 65 which is actuated to remove the cores 56 from the mold and the normally open contacts $ST_2$ which are closed when the timer ST times out. Connected in series circuit relation in line $o$ is a solenoid 23b of the cylinder 23 which is energized to raise the piston 61, and the normally open contacts LS–11 a which are closed when the limit switch LS–11 is actuated. Connected in series in line $q$ is a solenoid $S_2$ which is energized to drive the stripper head S downwardly, and the normally open contacts LS–11b which are closed when limit switch LS–11 is actuated. Connected in series in line $r$ is a timer T' and the normally open contacts LS–12b associated with the limit switch LS–12 which is actuated when the stripper head S reaches its full line position shown in FIG. 1. The timer T' has a plurality of contacts, not shown, which control the motor (not shown) for moving the feed box F over the mold until it releases its charge into the mold box M and then rearwardly out of position to enable the stripper head S to be lowered. Connected in series circuit relation in line $s$ is the armature winding 20m of the motor associated with the endless chains 20 and the normally open contacts LS–13a which are closed when limit switch LS–13 located adjacent the cylinder 24 is actuated. Connected in series in line $t$ is the solenoid 60b for raising the piston 61 and the normally open contacts LS–11c which are closed when the limit switch LS–11 is actuated.

The operation will be described with reference to FIG. 6 and it will be assumed that a previous cycle has just been completed and the pallet receiver P is in the dotted line position shown in FIG. 1, the stripper head S is in the down position, shown in dotted lines in FIG. 1, extending slightly below the bottom of the mold M and the pusher member 20a is in such position that a pallet $p$ is underneath the mold box M. It will further be assumed that the core adapter C is initially in the start position with the carriage 40 in the removed, broken line position, and that the core positioning plate 62 is in engagement with the cooperating plate 63 on the core positioning piston rod 61. The horizontal cores 56 are thus removed from the mold M and in position to be moved under the mold assembly M.

At the end of the previous cycle when the pallet receiver member P is in the lowered position, shown in chain lines in FIG. 1 of the drawing, it closes the normally open contacts LS–7a of the limit switch LS–7 which causes the solenoid $S_1$ of the air cylinder attached to stripperhead S to be energized to raise the stripper head S slightly upwardly from the chain line position shown in the drawing. The stripper head S will raise a very short distance, for example 3 inches, to actuate the limit switch LS–8 and will be stopped by the opening of the normally closed contacts LS–8a. The stripper shoes 26 temporarily remain in the mold M until after the horizontally extending cores 56 are moved adjacent the mold M. With the stripper head thusly positioned, the path is clear for the cores 56 to enter the mold and the molding material which remains in the hopper 18 and might inadvertently fall into the chamber 10a is precluded from passing therethrough.

Figure 2:
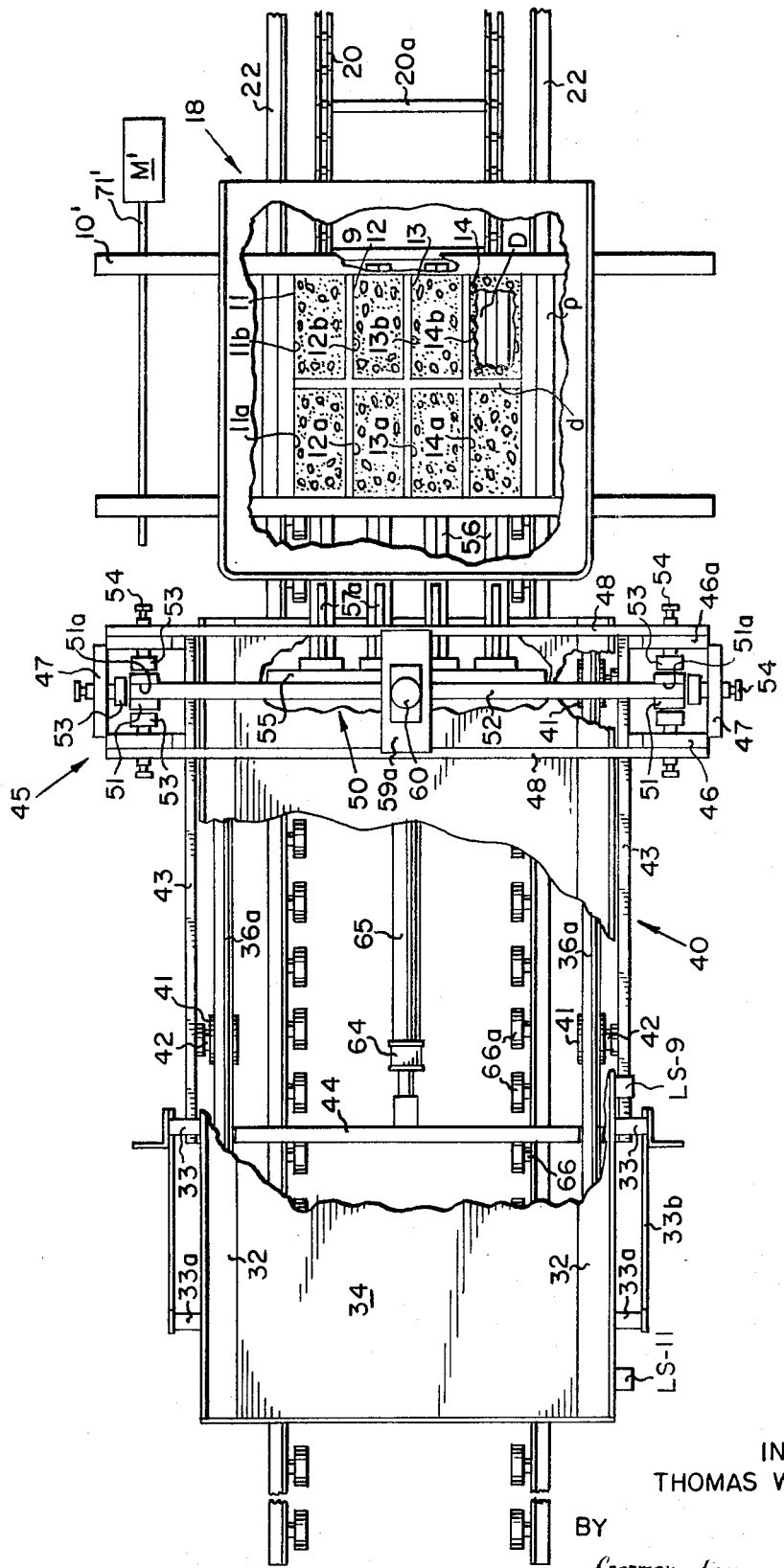
FIG. 2 is a fragmentary top plan view of the apparatus, parts being broken away or omitted to more clearly illustrate the invention.

When the limit switch LS–8 is actuated, the normally open contacts LS–8b are also closed and the solenoid 65a of the carriage positioning cylinder 65 is energized to move the core supporting carriage 40 from the removed position illustrated in chain lines toward the right as viewed in the drawing. When the core supporting carriage 40 has been moved to the end of its stroke and the cores 56 are now disposed underneath the mold assembly M, the normally open contacts LS–9a of a limit switch LS–9 will be closed which will energize the solenoid 60a of the core positioning cylinder 60 to move the piston 61 and the attached core positioning plate 62 from the downward position to its raised position, as shown in full lines in the drawing. When the core positioning plate 62 moves upwardly and the limited switch LS–10 is actuated and the normally open contacts LS–10a are closed, the advance solenoid 23a of the pallet receiver positioning cylinder 23 is energized, thereby causing the pallet moving piston 24 to be raised upwardly into engagement with the underside of a pallet p which is in position under the mold box M. The actuation of the limit switch LS–10 also closes the normally open contacts LS–10c to energize the stripper head raising solenoid $S_1$ and move the stripper heads S to the full line position shown in FIG. 1. In addition, the actuation of the limit switches LS–9 and LS–10 closes the normally open contacts LS–9b and LS–10b respectively to start the timer T. With the pallet p moving upwardly under the force of the pallet receiver P, it will press the cores 56 tightly into the cutouts 57 and provide a closure for the passage 10a. In this position, the pallet $p$ will extend flush with the bottom of mold box M. When the stripper head S moves upwardly to the full line position, it is latched in position by a solenoid opened, spring closed latching switch $LS_1$, the normally closed contacts LS–12a are opened to deenergize the stripper head raising solenoid $S_1$, and the normally open contacts LS–12b are closed to start the timer T' which controls a motor (not shown) for moving the feed box F forwardly over the mold box M. The bottom of the mold box M will be opened in the normal manner to permit cementitious material to flow therethrough into the mold box M. Simultaneously with the delivery of the charge from the feed box F, a switch $M_2$ is closed to energize the motor M' to vibrate the mold box M. The motor M' drives the shaft 71 which is eccentrically connected with the extension 10' of walls 10 as shown in FIG. 2. When the mold has been filled, the timer controlled feed box F is moved rearwardly of the mold box to enable the stripper head S to move downwardly from the full line position shown in the drawing. When the timer T times out, the normally open contacts $T_1$ close to energize the latching switch $LS_1$ to release the stripper head S and permit it to move downwardly under the force of gravity. The head S is first lowered into contact with the upper surface of the material in the mold to level and compress the material to the desired compaction. During this time, the motor M' will continue to vibrate the mold assembly to eliminate voids in the material as the heads 26 press downwardly against the upper surface of the plastic material in the mold compartments 11 – 14. When the motor winding $M_1$ is energized, a set of normally open contacts $M_3$ associated therewith are closed to start a delay strip timer ST. When the blocks have been sufficiently vibrated, the delay strip timer ST times out to (1) open the normally closed contacts $ST_1$ and deenergize the motor winding $M_1$ and (2) to close the contacts $ST_2$ to energize the reverse solenoid 65b for the carriage positioning cylinder 65 to return the carriage 40 to the chain line position and remove cores 56 from the cutout portions 57. As soon as the free ends of the cores 56 are removed from the cutout portions 57, the biasing force of the springs 58 will move the member 50 upwardly. The rearward movement of the carriage will trip the limit switch LS–11 at the end of its movement to the left as viewed in the drawing to close the normally open contacts LS–11a and LS–11b. The closure of contacts LS–11A energizes the reverse solenoid 23b to permit the pallet receiver P to be moved downwardly with the stripper head S which is moved downwardly when the contacts LS–11b close to energize the reverse solenoid $S_2$ for the air cylinder which operates the stripper head S to eject the molded blocks A from the mold ring M as they are supported on the pallet p. As described hereinbefore, the stripper heads 26 do not entirely emerge from the chamber 10a in the mold assembly M. The pallet receiver P will continue to move downwardly until the pallet member p engages the tracks 22. The pallet p loaded with green blocks may then be manually pushed to the left onto the rollers 66a or automatically moved thereon by the next succeeding pallet when it is moved into position under the mold M. When the pallet receiver is in position so that the pallet p is resting on the tracks 22, the contacts LS–13b associated with the limit switch LS–13 are closed to energize the chain drive motor 20m to move the next pallet into position. The blocks are then transported to a curing room on the rollers 66a. When the normally open contacts LS–11c of the limit switch LS–11 close, the solenoid 60b for the core positioning cylinder 60 is energized to move the plate 62 downwardly and force the horizontal cores 56 downwardly away from the end of the mold box M so as to be in position to move under the mold when the cylinder 65 is energized. With the pallet receiver P in the dotted line position shown in FIG. 1, the limit switch LS–7 will again be energized to repeat the cycle.

As can be appreciated, the placement of the cores 56 on the pallet p adjacent the bottom of the mold box M causes a contour or channel to be placed in the surface of one wall of each block A. A plurality of blocks having aligned channels can be utilized to form a wall and reinforcing rods may be situated within the channels of the adjoining blocks and in this manner rigidify and unify a wall structure built from blocks formed according to the invention. As shown in the drawings, the springs 58a of the core are adapted to provide a resilient mount for the core assembly which is thus permitted to vibrate with the mold box and the pallet when the motor M' is energized. A typical installation will cause the mold box M to be vibrated at a rate of approximately 2,800 cycles per minute. If springs 58a were not provided, this vibration would be transferred to the carriage 40 and the frame 30 on which it is mounted. Thus, the resilient mounting devices 58a are effective to isolate the frame 30 from this vibratory motion.

It should further be realized that because of the horizontal core adapter formed according to the invention, the same pallet members can be used in the formation of various sizes and shapes of contours in the lower surfaces of the blocks merely by substituting core members 56 of different shape. As can be appreciated, this reduces the inventory of various types of pallet members which would be otherwise required if a different type pallet member was required for each core of different shape.

It should further be appreciated that by first lowering the core members 56 with cylinder 60, and then moving them horizontally under the mold assembly M with cylinder 65, prior to raising them upwardly into engagement with the cutout 57, a much closer fit of members 56 in the cutouts 57 is achieved.

The invention is defined in the claims.
What I claim is:
1. Apparatus for forming a cementitious block comprising:
supporting frame means;
means thereon for forming a mold cavity including a relatively movable mold assembly and a pallet adjacent the lower end thereof for closing the lower end thereof, and a movably mounted longitudinally extending core movable between a removed position and a position in which it is disposed between said pallet and said mold assembly;
means supported by said frame means mounting said longitudinally extending core for movement in a longitudinal and upward path of travel between said positions;
means supported by said frame means for moving said longitudinally extending core in said path;
means supported by said frame means for relatively vertically moving said pallet and said mold assembly to sandwich said core therebetween and form a closed mold cavity;
means supported by said frame means for pouring cementitious material over said core and said pallet in said mold cavity to form the block;
means supported by said frame means for relatively moving said core and said pallet to separate the core therefrom; and
means supported by said frame means for relatively moving said block and pallet and said mold assembly to remove the block from the mold assembly.

2. Apparatus as set forth in claim 1 wherein said longitudinally extending core and said pallet are relatively moved generally horizontally; and said block and said mold assembly are relatively moved generally vertically.

3. Apparatus as set forth in claim 2 including vibrating means for simultaneously vibrating said mold assembly, longitudinally extending core, and pallet.

4. The apparatus set forth in claim 1 further including biasing means yieldably but constantly urging said longitudinally extending core upwardly.

5. The apparatus set forth in claim 1 including means for vibrating the mold assembly to compact said cementitious material; said core moving means including carriage means movable in a longitudinal to-and-fro path of travel; said core being mounted on said carriage means for movement therewith in said longitudinal path of travel and for movement relative thereto in a vertical to-and-fro path of travel; means for longitudinally moving said carriage means in said longitudinal to-and-fro path; and means on the carriage means for vertically moving said core downwardly in said vertical path when said core is in said remote position to move said core to a position below said mold assembly, and movable in a direction away from said core when the core is in said operative position to permit the core to enter the mold assembly.

6. The apparatus set forth in claim 4 including yieldable means on said carriage means urging said core upwardly, when the means for vertically moving the core moves in a direction away from the core, to move the core into the mold assembly.

7. The combination defined in claim 1 in which means is provided for vibrating said mold assembly.

8. The combination defined in claim 7 in which means is provided for isolating said supporting frame means from the vibration of said mold assembly.

9. The combination defined in claim 8 in which said core is mounted for travel on a longitudinally traveling carriage and supported thereon for vertical movement.

10. The combination defined in claim 9 in which yieldable means supports said core for vertical movement.

11. The combination defined in claim 10 in which said yieldable means comprises a spring.

12. The combination defined in claim 10 in which a fluid pressure operated cylinder assembly is provided on said carriage in engagement with said core in one position thereof for moving said core vertically.

13. The combination defined in claim 11 in which said cylinder assembly is withdrawable from said core to be out of engagement therewith.

14. The combination of claim 11 in which said spring is connected to bias said core upwardly as the core is moved beneath said mold.

15. Apparatus for forming a cementitious block comprising:
supporting frame means;
means thereon for forming a mold cavity including a relatively movable mold assembly and a pallet adjacent the lower end thereof for closing the lower end thereof, and a movably mounted longitudinally extending core movable between a removed position and an operative position in which it is disposed between said pallet and said mold assembly when the pallet is in closed position;
means supported by said frame means mounting said core for movement in a path longitudinally to a position below said mold assembly, thence upwardly to operative position, thence for longitudinal withdrawal movement, and thence downwardly before repeating the cycle;

means supported by said frame means for moving said core in said path;

means for moving said pallet to sandwich said core between the pallet and mold assembly when the core is in operative position to form a closed mold cavity;

means supported by said frame means for pouring cementitious material over said core and said pallet in said mold cavity to form the block;

means supported by said frame means for relatively moving said core and said pallet to separate the core therefrom; and means supported by said frame means for relatively moving said block and said mold assembly to remove the block from the mold assembly.

16. Apparatus for forming a cementitious block comprising:

a support framework;

means for forming a mold cavity including a mold assembly, a pallet adjacent the lower end thereof for closing the lower end thereof, and a longitudinally extending core mounted for movement between a remote position and an operative position between said pallet and said mold assembly;

means for vibrating the mold assembly;

carriage means mounted on said framework for movement in a longitudinal to-and-fro path of travel;

core support means for supporting said core;

means yieldably mounting said core support means and said core on said carriage means for movement relative thereto in to-and-fro vertical paths of travel to isolate the vibration which would otherwise be imparted to said carriage means and framework;

means for longitudinally moving said carriage means to move said core between said remote and operative positions; and means engageable with said core support means for moving said core support means and core vertically against the bias of said yieldable mounting means when said core is in said remote position.

17. The apparatus set forth in claim 16 wherein said means for moving the core support means and core vertically is mounted on said support framework and is disengageable from said core support means when said core is in the adjacent position to isolate the vibration which would otherwise be transmitted to the carriage means and support framework.

* * * * *